US007290214B2

(12) United States Patent
Sidle et al.

(10) Patent No.: US 7,290,214 B2
(45) Date of Patent: Oct. 30, 2007

(54) INDEPENDENT DEFERRED INCREMENTAL REFRESH OF MATERIALIZED VIEWS

(75) Inventors: Richard S. Sidle, Mountain View, CA (US); Dieu Q. La, Markham (CA); Petrus Kai Chung Chan, Richmond Hill (CA); Roberta J. Cochrane, Los Gatos, CA (US); William T. O'Connell, Etobicoke (CA); M. Hamid. Pirahesh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 10/427,382

(22) Filed: Apr. 29, 2003

(65) Prior Publication Data

US 2004/0122828 A1 Jun. 24, 2004

(30) Foreign Application Priority Data

Dec. 23, 2002 (CA) .................................. 2414983

(51) Int. Cl.
G06F 3/00 (2006.01)
G06F 17/30 (2006.01)

(52) U.S. Cl. .......................................... 715/748; 707/2
(58) Field of Classification Search ................ 715/748; 707/2
See application file for complete search history.

(56) References Cited

U.S. PATENT DOCUMENTS

| 4,631,673 | A | 12/1986 | Haas et al. ................. 364/300 |
| 6,125,360 | A | 9/2000 | Witkowski et al. ............ 707/2 |
| 6,134,543 | A | 10/2000 | Witkowski ..................... 707/2 |
| 6,205,451 | B1 | 3/2001 | Norcott et al. .............. 707/204 |
| 6,587,857 | B1 * | 7/2003 | Carothers et al. ........... 707/102 |
| 7,028,022 | B1 * | 4/2006 | Lightstone et al. ............ 707/2 |
| 7,167,853 | B2 * | 1/2007 | Zaharioudakis et al. ....... 707/2 |

OTHER PUBLICATIONS

Colby, Latha S. et al., "Algorithms for Deferred View Maintenance," Sigmod, Jun. 1996, Montreal, Canada, pp. 469-480.
Kulkarni, Uday R. et al., "Independently Updated News," IEEE Transactions on Knowledge and Data Engineering, vol. 9, No. 5, Sep./Oct. 1997, pp. 796-812.
Mumick, Inderpal, S. et al., "Maintenance of Data Cubes and Summary Tables in a Warehouse," ACM 1997, pp. 100-111.

* cited by examiner

Primary Examiner—Raymond J. Bayerl
Assistant Examiner—Le Nguyen
(74) Attorney, Agent, or Firm—Sawyer Law Group LLP

(57) ABSTRACT

A system and method for directing a data processing system to incrementally process a base table and a materialized view, wherein the materialized view is associated with the base table, and both are stored in the system, is disclosed. The method includes setting integrity of the base table having an identifier identifying data newly load appended to the base table, and placing the identifier into a location if the location does not contain any other identifier identifying any other data newly load appended to the base table. In a preferred embodiment, the materialized view is incrementally refreshed using the identifier.

26 Claims, 10 Drawing Sheets

CA9 2002 0036

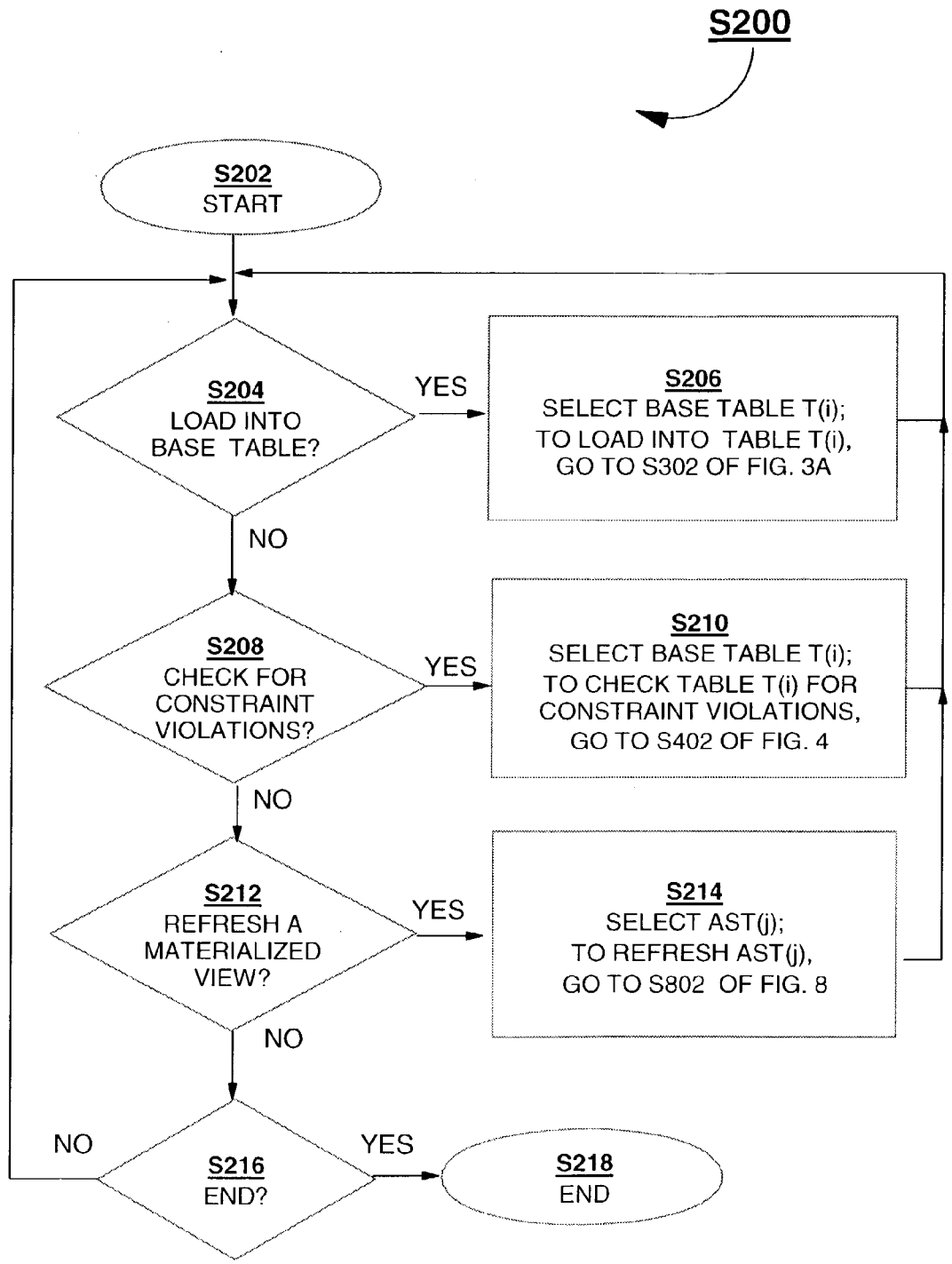

CA9 2002 0036

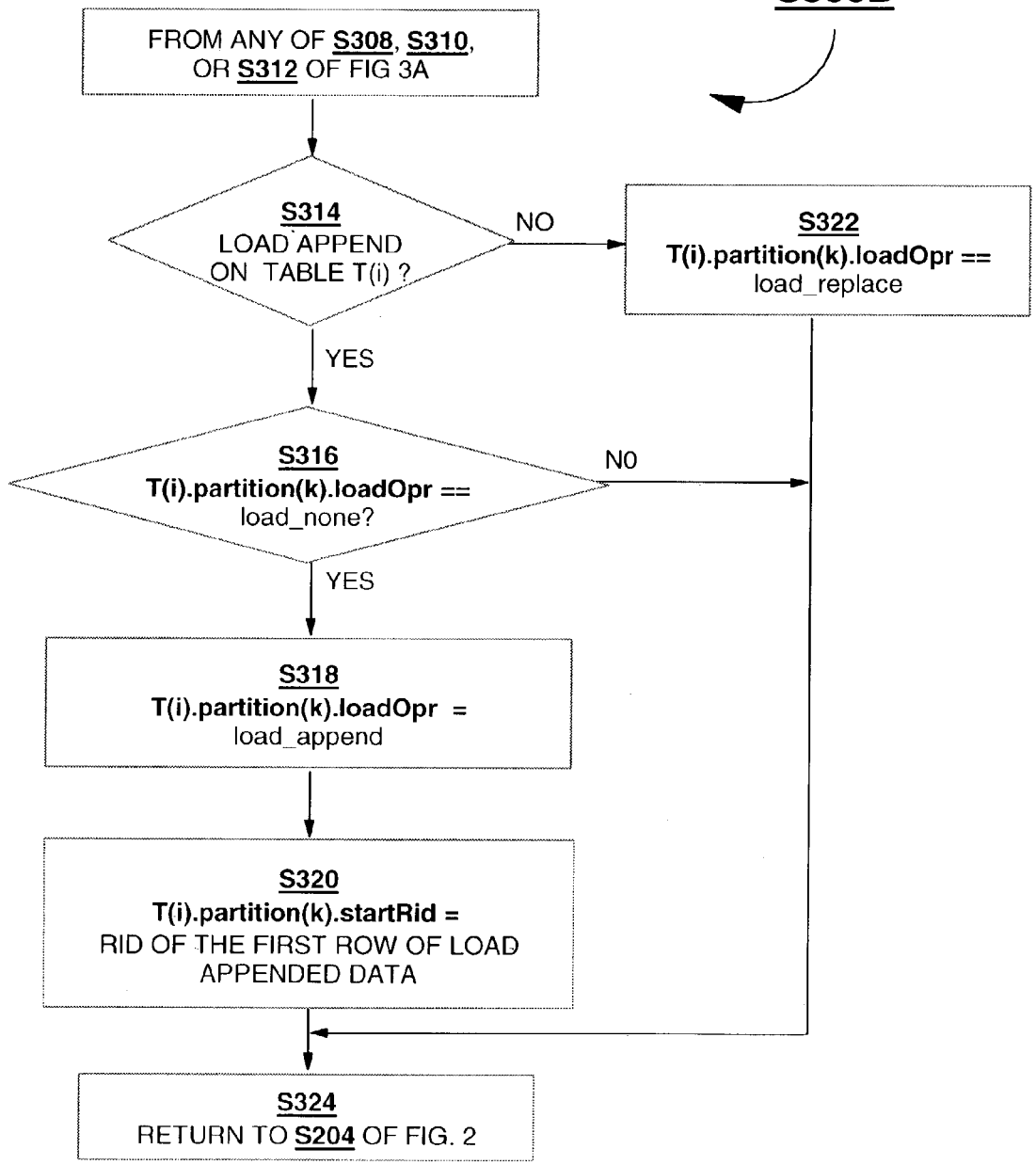

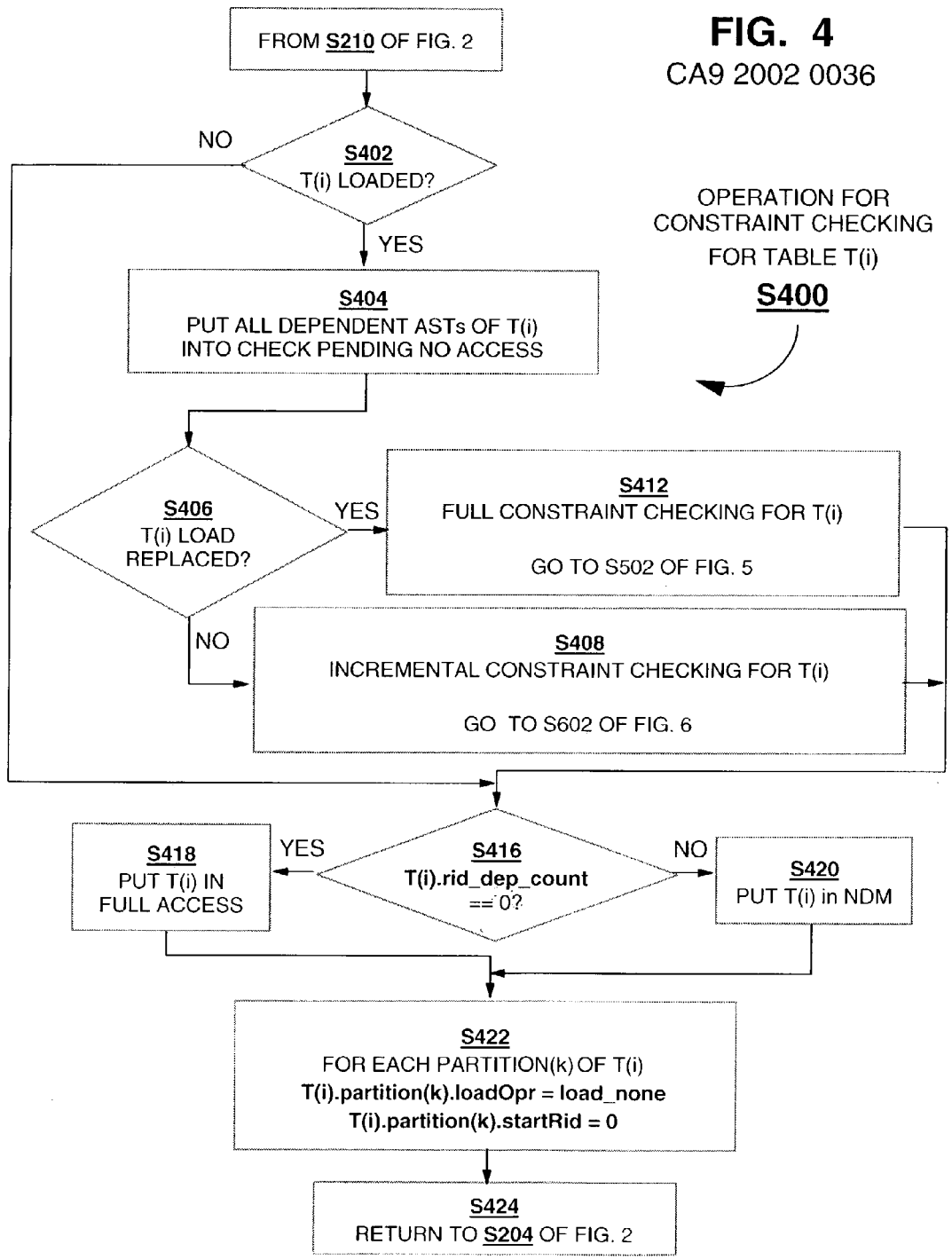

OPERATION FOR
FULL CONSTRAINT
CHECKING FOR
TABLE T(i)

S500

FROM S412 OF FIG.4

S502
FOR EACH DEPENDENT AST(j) OF TABLE T(i)
set AST(j).force_full = true
set AST_PD(j)=NULL

S504
T(i).rid_dep_count = 0

S506
CHECK ENTIRE TABLE T(i)
FOR CONSTRAINT VIOLATIONS

S508
RETURN TO S416 OF FIG. 4

FIG. 6
CA9 2002 0036

OPERATION FOR
INCREMENTAL
CONSTRAINT CHECKING
FOR TABLE T(i)

S600

FROM S408 OF FIG. 4

S602
FOR EACH DEPENDENT AST(j) OF TABLE T(i)
COPY RIDs OF TABLE T(i) to AST_PD of AST(j)

GO TO S702 OF FIG. 7

S606
USE THE startRid IN EACH PARTITION OF TABLE T(i) to
BUILD THE RIDGE PREDICATE TO PERFORM
INCREMENTAL CONSTRAINT CHECKING FOR TABLE T(i)

S608
RETURN TO S416 OF FIG. 4

INDEPENDENT DEFERRED INCREMENTAL REFRESH OF MATERIALIZED VIEWS

CROSS-REFERENCE TO RELATED APPLICATIONS

This application claims benefit under 35 USC §119 of Canadian Application No. 2,414,983, filed on Dec. 23, 2002.

FIELD OF THE INVENTION

The present invention relates to database management systems. More specifically, the present invention relates to refreshing of materialized views.

BACKGROUND OF THE INVENTION

When known DBMSs (Database Management Systems) execute a database query against a base table or a set of base tables, a materialized view may be accessed instead. The materialized view may have a definition that is based on the query result. A materialized view may contain computed data based on existing data found in a base table or base tables. The materialized view is associated or related to the base tables (that is, the definition of the materialized view is based on the base tables). The materialized view may be used by the DBMS for optimizing or improving a response time when processing a database query which may be applied against a set of base tables associated with the materialized view. The database query may be rewritten or recompiled by the DBMS in which the recompiled, executable query may direct the DBMS to access the materialized view (the data stored in the materialized view was previously computed), and hence reduce the response time of the database query. However, in order to ensure the integrity of the original database query (once the query has been rewritten to access the associated materialized view), the data contained in the materialized view must be maintained to match the query definition of the materialized view.

Known DBMSs may include operation for fully refreshing a materialized view. This known operation requires a significant amount of time and computation effort to execute, which may be unsatisfactory and inconvenient because fully refreshing the materialized view may require a complete recomputation of a materialized view definition. Recomputation of a materialized view definition includes operations for evaluating the query that the materialized view is defined on and operation for populating the materialized view with the result of this query.

Referring to U.S. Pat. No. 6,205,451 (titled, "Method and Apparatus for Incremental Refresh of Summary Tables in a Database System"), there is described a method and a system for incremental refresh of materialized views after a load append operation is performed; more specifically, this reference describes a method for performing an operation for incrementally refreshing a materialized view once load appended rows of a base table (or base tables) are located or found. It is noted that this reference identifies U.S. Pat. No. 5,848,405 (titled, "Method and Apparatus for Identifying New Data by Address Ranges") which teaches a method and a system for finding delta rows that may be used for incrementally maintaining the materialized view described in U.S. Pat. No. 6,205,451. The combination of the aforementioned references disadvantageously require all materialized views to be refreshed at the same time after associated base tables have been loaded. The following example shows the limits that may be realized by the combination of U.S. Pat. No. 6,205,451 and U.S. Pat. No. 5,848,405. Assuming that a base table B1 has two associated or related materialized views A1 and A2, a user may perform N load append operations on the base table B1. Then the user may incrementally refresh the materialized view A1. However, if the user desires to load additional data into the base table B1, the user is required to refresh the materialized view A2 before the second set of data may be load appended to the base table B1 (which may present an inconvenient limitation for the user).

Accordingly, a solution that addresses, at least in part, this and other shortcomings is desired.

SUMMARY OF THE INVENTION

A method and a system for refreshing of materialized views (such as summary tables and the like) is provided. The method and the system directs a data processing system to independently defer incremental refreshing of a set of materialized views after loading or load appending data to base tables (associated with the materialized views) has been performed.

Selective incremental refreshing of any materialized view is provided while an associated base table (or base tables associated with the materialized view) may be partially loaded or appended with new data. The method and the system allow flexible sequencing of operations for incremental refreshing of a materialized view, and then loading additional data to a base table associated with the materialized view, and then incrementally refreshing any other materialized view. Assuming that a base table B1 has two materialized views A1 and A2, after refreshing the materialized view A1 a user may elect to load additional data to the base table B1 before incrementally refreshing the materialized view A2. Advantageously, operations for incremental refreshing (materialized views) and loading (base tables) may be performed alternately (that is, in an incremental manner). Advantageously, the method and the system provides flexible, independent execution of alternative operations for incrementally processing materialized views and base tables.

There is also provided a database system having an improved availability of base tables and associated materialized views. After a load append operation is performed on a base table, the initially non-appended data in the base table remains accessible or readable. Moreover, all dependent materialized views of the base table also remains accessible or readable and the accessible data in the materialized view may be used in query optimization. Once the load-appended base table is incrementally checked for integrity violations, this base table becomes fully readable (including the newly load-appended data). Updates on the base table are permitted as long as an update does not move data around and does not affect associated materialized views that have yet to be refreshed. Once any materialized view has been refreshed, the materialized view becomes fully accessible or readable immediately.

An embodiment of the present invention provides a method for directing a data processing system to incrementally process a base table and a materialized view of the base table both stored in the data processing system, the method including setting an integrity attribute for the base table, the integrity attribute having an identifier identifying data newly load appended to the base table, and placing the identifier into the materialized view, the materialized view devoid of other identifiers identifying any other data newly load appended to the base table.

Another embodiment of the present invention provides a data processing system for directing a data processing system to incrementally process a base table and a materialized view of the base table both stored in the data processing system, the method including means for setting an integrity attribute for the base table, the integrity attribute having an identifier identifying data newly load appended to the base table, and means for placing the identifier into the materialized view, the materialized view devoid of other identifiers identifying any other data newly load appended to the base table.

Yet another embodiment of the present invention provides a method for directing a data processing system to incrementally process a base table and a materialized view both stored in the data processing system, the materialized view associated with the base table, the method including setting integrity of the base table having an identifier identifying data newly load appended to the base table, and placing the existing identifier into a location not containing any other identifiers identifying any other data newly load appended to the base table.

Yet another embodiment of the present invention provides a data processing system for directing a data processing system to incrementally process a base table and a materialized view both stored in the data processing system, the materialized view associated with the base table, the method including means for setting integrity of the base table having an identifier identifying data newly load appended to the base table, and means for placing the existing identifier into a location not containing any other identifiers identifying any other data newly load appended to the base table.

Yet another embodiment of the present invention provides a computer program product having a computer-readable medium tangibly embodying computer executable instructions for implementing any data processing system or any method described in above.

Yet another embodiment of the present invention provides an article including a computer-readable signal-bearing medium, and means in the medium for implementing any data processing system or any method described above.

BRIEF DESCRIPTION OF THE DRAWINGS

A better understanding of these and other embodiments of the present invention can be obtained with reference to the following drawings and detailed description of the preferred embodiments, in which:

FIG. 2 shows operations of the DBMS of FIG. 1;

FIG. 3B shows operation of the DBMS of FIG. 1 for loading data into a k-th partition of the base table;

FIG. 4 shows operation of the DBMS of FIG. 1 for checking constraints of the base table;

FIG. 5 shows operation of the DBMS of FIG. 1 for full constraint checking of the base table;

FIG. 6 shows operation of the DBMS of FIG. 1 for incremental constraint checking of the base table;

Figure 1A:
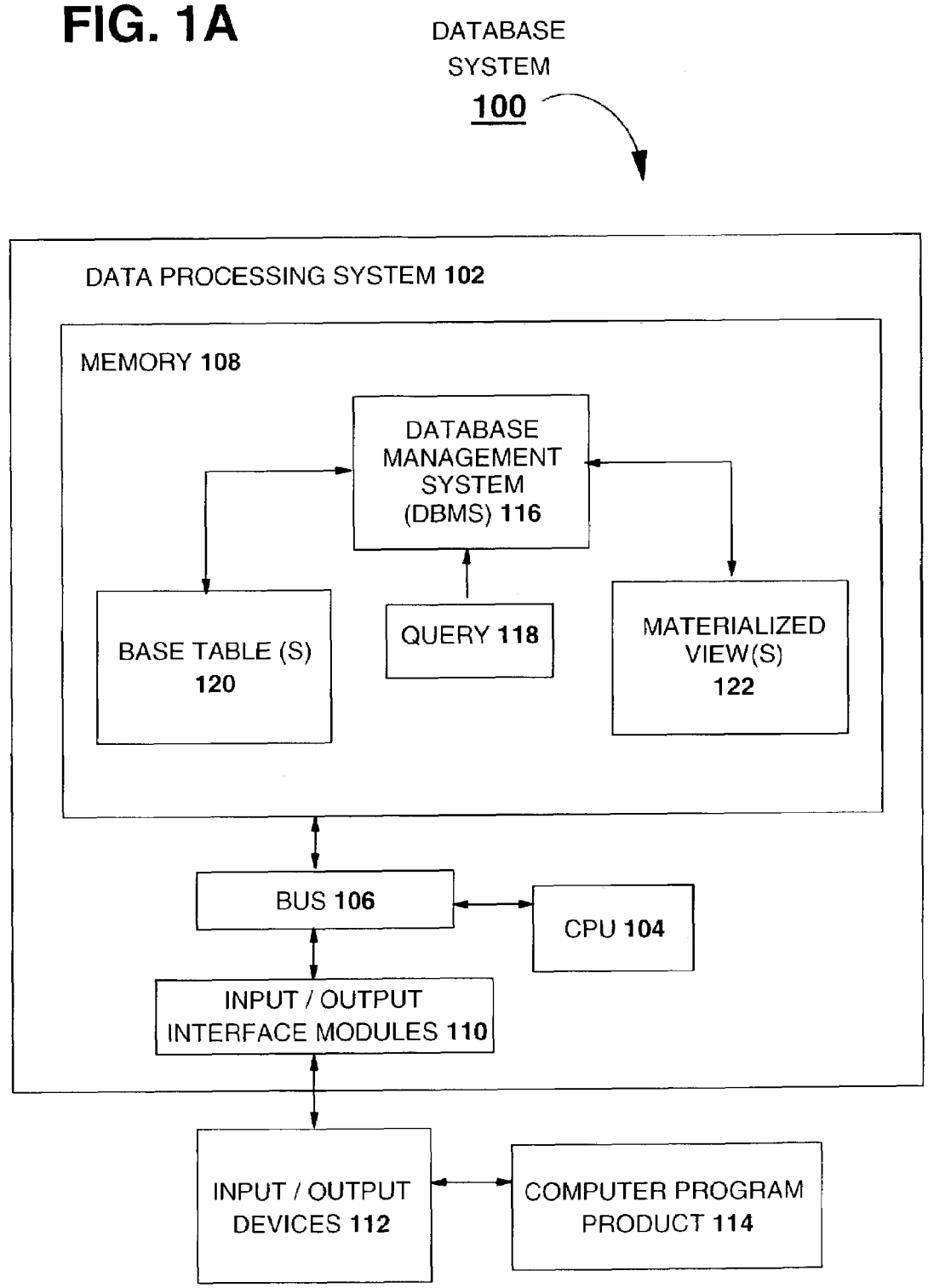
FIG. 1A shows a database management system (DBMS) stored in the memory of a data processing system.

Similar references are used in different figures to denote similar components.

DETAILED DESCRIPTION

The following terminology is used throughout the detailed description, and it is presented in alphabetical order:

"AST" is a materialized view. An example of a materialized view is a summary table. Multiple ASTs may be involved in the embodiments of the present invention, in which case the j-th AST is labelled AST(j) or ASTj. Generally speaking, a materialized view is a table whose definition is based on the result of a query and whose data is in the form of precomputed results taken from the table or tables that its definition is based on; this definition does not require that the query be aggregated or summarized. It is appreciated that 'summary' does not necessarily imply 'aggregation'.

"AST.force_full" is an attribute or condition in which if this attribute is set to TRUE a materialized view cannot be incrementally refreshed, and the materialized view will require a full refresh. The materialized view requires full refresh if any of its associated base tables have been load replaced;

"AST_PD" is a packed descriptor for a materialized view, in which starting RIDs of the base tables used for incremental refresh of the materialized view are stored. Multiple ASTs may be involved. The packed descriptor for the j-th materialized view is labelled "AST_PD(j)" or "AST_PDj";

"AST_PD.T(i).partition(k).startRid" or "AST_PD.Ti.partitionk.startRid" is a startRID in the k-th partition of an i-th base table that an AST depends on (or is referred thereto);

"base table T" is a base table identified by a particular label or identifier "T"; and multiple base tables may be involved in the embodiments of the present invention; an i-th base table is labelled "base table T(i)", "table T(i)" or "base table T(i)" (or similar); generally speaking, a base table is a table created with the CREATE TABLE statement (generally used in query languages used for querying or controlling databases via a database management system).

The following terminology below is not specific to base tables, and this terminology may be applied to any types of tables.

"check pending state" is a state of a table in which access to the table is restricted; generally speaking, the check pending state is the state of a table where only limited activity is allowed on the table and constraints are not checked when the table is updated;

"CPNA" or "check pending no access state" is a state of a table in which read access and write access to the table are not allowed;

"check pending period" (that is, a duration or lapse of time) is a period of time which begins when a table enters a check pending state (as a result of a load operation), and which ends when the table is taken out from the check pending state; for example, the table may begin the check pending period as a result of a load operation, and the table may end the check pending period when a SET INTEGRITY statement is used to bring the table out of the check pending state;

"CPRA" or "check pending read access state" is a state of a table in which read access to the base table is allowed, and in which write access to the table is not allowed;

"FA" or "full access state" is a state of a table in which read and write access to the table are allowed;

"full constraint checking" is an operation for checking all rows in a base table for constraint violations;

"full refresh" is an operation for fully refreshing a materialized view by recomputing a materialized view definition of the materialized view;

"incremental constraint checking" is an operation for checking only newly appended rows in a base table during the current check pending period for constraints violations;

"incremental refresh" is an operation for incrementally refreshing a materialized view by only using rows that are load appended to base tables since the last time the materialized view had been refreshed;

"load append" is an operation for retaining existing rows of a table and for appending new rows to the table;

"load replace" is an operation for removing existing rows of a table and for replacing the removed existing rows of the table with new rows;

"NDM" or "no data movement state" is a state of a table in which read access to the table is allowed, and in which write access to the table is allowed provided that the RIDs in the table are not affected and provided that access to a materialized view is not required;

"PAGE0_RID" is the starting RID in page '0' of a base table;

"SUM_RID" is the starting RIDs in a materialized view packed descriptor;

"materializewd view" records a starting location (that is, the starting RIDs) of newly appended data in each partition of each base table that is required for performing an operation for incrementally refreshing a materialized view;

"RID" is a unique row identifier (ID) for identifying a row in a partition of a table;

"RDC" or "rid_dep_count" is a count used to keep track of the number of materialized views (associated with a base table) requiring incremental refresh;

"T(i).partition(k)" or "Ti.partitionk" is a k-th partition of table T;

"T(i).partition(k).startRid" or "Ti.partitionk.startRid" is a row identifier (RID) of a first row of a first load append operation performed on a k-th partition of table T in a current check pending period;

"T(i).partition(k).loadOpr" or "Ti.partitionk.loadOpr" is the most expensive load operation on a k-th partition of table T during a check pending period; and "T(i).rid_dep_count" or "Ti.rid_dep_count" is a number of ASTs (that is, materialized views) that need to be incrementally refreshed using RIDs of table T(i); this variable is used to determine whether the table T(i) goes into full access state or goes into no data movement state after the table T(i) is brought out of a check pending state.

FIG. 1 shows a database system 100 including a data processing system 102 having a memory 108 tangibly embodying database management system (DBMS) 116, base tables 120, query 118, and materialized views 122. The collection of base tables 120 and materialized views (such as summary tables) 122 may be included collectively in database system 100, and that database system 100 may be stored in memory 108. Alternatively, base tables 120 and/or materialized views 122 may be stored in memories associated with a plurality of distributed data processing systems (not depicted) which may be interconnected by a network (not depicted). Memory 108 may include volatile and non-volatile memory such as RAM (random Access memory) and/or ROM (read-only memory). Also embodied in memory 108 is an operating system (not depicted) which may execute or operate on data processing system 102 for managing input and output requirements of other computer executable programs (such as DBMS 116). Operating systems perform basic tasks such as recognizing input from a keyboard, sending output to a display screen, keeping track of files and directories on a memory disk, and controlling peripheral devices such as disk drives and printers connected to data processing system 102. Memory 108 is operationally coupled to a CPU (Central Processing Unit) 104, and input/output interface modules 110 via a bus 106. Operationally coupled to input/output interface modules 110 are input/output devices 112 (such as the keyboard, a mouse, the display unit which are not depicted), and persistent memory devices (such as a hard drive and/or a floppy drive which are depicted). A computer program product 114 (floppy disk, CD disk, hard drive and the like) having a computer readable medium for tangibly embodying computer executable instructions (that implement embodiments of the invention), in which the instructions may be loaded into memory 108 of data processing system 102 and then executed by CPU 104. It will be appreciated that the computer executable instructions may be downloaded to data processing system via some network (not depicted) connected to a network interface (not depicted) operationally coupled to input/output interface modules 110.

Database system 102 implements a method for independent deferred incremental refresh of materialized views 122 after load appending data to base table 120. The operation of database system 102 begins by load appending data to base table 120. The load append operation stores a starting RID (that is, a row ID) in page 0 of each loaded partition of the base table. A RID identifies or represents a location in each partition of the base table where the load append initiated. For each partition of the base table, all load appended rows in that partition have a RID greater or equal than the starting RID stored in page 0 of that partition. The starting RIDs are used later on in the operation of the database system 102 to locate or identify, in each partition, all the newly load-appended rows required in an incremental refresh operation of dependent or associated materialized views (that is, materialized views associated with the base table). The load append operation does not overwrite a non-zero starting RID in page 0 (which allows multiple load append operations on the base table before performing an operation for incrementally refreshing any related or associated materialized views).

After a base table has been load appended, the base table is placed into a "check pending read access" state. While the base table is in this state, updates to the base table are disallowed. However, read access to the initial non-load appended data stored in the base table is allowed (because only the newly load appended data will require integrity checking). Furthermore, materialized views associated with the base table may remain fully readable. Hence, the availability of the materialized views is independent of the load operations on their associated base tables.

Next, an operation is performed for checking integrity violations in newly appended data of a base table. This integrity checking can be done incrementally. This method is known to persons of ordinary skill in the art. For example, this known method is presented in a published pending Canadian Patent Application CA9-1999-0028 (the title of which is "System and Method for Selective Incremental Deferred Constraint Processing after Bulk Loading Data", published 30 Jan. 2001). When performing the operation for incremental integrity checking of the base table, the starting RIDs from page 0 of each partition of the base table is read, and the starting RIDs are copied to a packed descriptor in a catalogue of all dependent materialized views. Eventually, this materialized view packed descriptor records the starting location (the starting RIDs) of the newly appended data in each partition of each of base table that is required to perform an operation for incrementally refreshing the materialized view. Again, while the starting RIDs are copied to the materialized view packed descriptor, the non-zero starting RIDs are not overwritten. This allows multiple load append and incremental integrity checking operations on the base tables before incrementally refreshing the materialized views. The starting RID in page 0 of the base table is then reset to zero.

After a base table has been incrementally checked for integrity violations, the base table is placed into a no data movement state. While in this state, the base table is fully readable. However, updates to the base tables that will affect its dependent materialized views that have not been refreshed yet as well as operations that will move data around and changing the RIDs in the base table are not permitted (that is, disallowing movement of data stored in the base table). Note that updates to the base table that will not affect any dependent (associated) materialized views that have not been refreshed yet are allowed while the base table is in the no data movement state. Another load operation on the base table may be also allowed while the base table is in this state. Unless another load operation occurs on the base table, the base table remains in the no data movement state until all of its dependent materialized views are refreshed. A count, called rid_dep_count, per base table is used to keep track of the number of dependent materialized views that still requires to be incrementally refreshed. As the base table is placed into the no data movement state, this rid_dep_count is initially set to the number of dependent materialized views. The rid_dep_count of a base table is decreased by one each time one of the base table's dependent or associated materialized views are incrementally refreshed. When the rid_dep_count is decreased to a zero count, the base table is brought out of the no data movement state and becomes fully accessible and available for use by users.

As soon as a base table is placed into a no data movement state and then becomes readable or accessible, all of the base table's dependent or associated materialized views are placed in a check pending no access state because refresh of the materialized views is required to maintain the integrity of these materialized views. Incrementally refreshing a materialized view is accomplished by accessing the starting RIDs stored in the materialized view packed descriptor. These starting RIDS are used for locating the newly load appended rows for each of the base table associated with the materialized view since the last time the materialized view was refreshed. Once the newly loaded appended rows are located, the materialized view may be incrementally refreshed. Exemplary refreshing algorithms are described in "Maintaining Views Incrementally" (authored by Ashish Gupta, Inderpal Singh Mumick, V. S. Subrahmanian, and was published in the ACM SIGMOD Journal in 1993), and in "Efficiently Updating Materialized Views" (authored by Jose A Blakeley, Per-Ake Larson, Frank Wm Tompa, and was published in the ACM SIGMOD Journal in 1986). As soon as one materialized view is refreshed, that refreshed materialized view is available for use by the DBMS 116 for optimizing a query to the base table. Thus, materialized views associated with or sharing the same base table may be incrementally refreshed in any order and at any point in time.

In another embodiment of the present invention, in order to ensure that the starting RIDs of all base tables of a materialized view are copied to the materialized view packed descriptor, the base tables associated with a materialized view are checked for integrity violations before refreshing the materialized view. It may appear that this appears to go against providing processing independence between operations such as loading data into a base table, checking base tables for integrity violation, and refreshing a materialized view. Actually, the reason that the materialized view cannot be refreshed before all its associated base tables are checked for violations is that if a base table hasn't been checked for violations yet, the base table remains in a check pending read access state. Another embodiment of the present invention does not support operation for refreshing an AST (that is, a materialized view) while any of its associated base tables are in a check pending state. The incremental refreshing of materialized views while one of its associated base tables remains in a check pending read access state may still be performed. If a base table associated with a materialized view remains in a check pending read access state, the startRID for that base table has not been copied to the packed descriptor of the materialized view yet. So, when incrementally refreshing the materialized view, the associated base table is treated as not having been loaded with data yet (that is, the loaded row in that base table is not used for incrementally refreshing the materialized view this time around). But next time the materialized view is incrementally refreshed, and if this time the base table has been checked for constraint violations, the loaded rows are used in that base table to incrementally refresh the materialized view. It will be appreciated that this alternative operation may be implemented in another embodiment of the present invention.

Figure 1B:
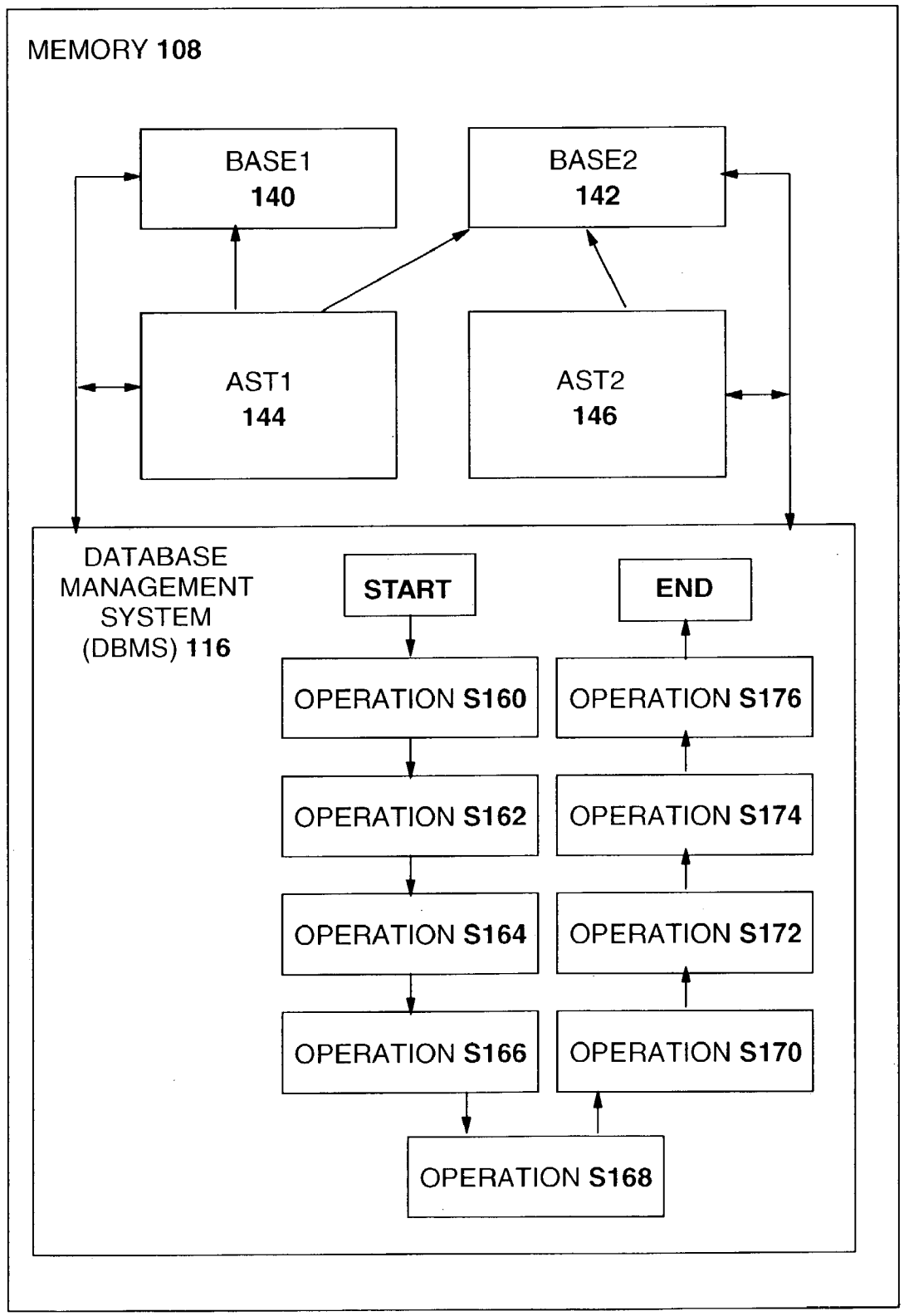
FIG. 1B shows base tables and materialized views used by the DBMS of FIG. 1.

FIG. 1B shows a computer readable memory 108 of FIG. 1. Stored in the memory 108 are base table_1 or BASE1 (item 140), base table_2 or BASE2 (item 142), a materialized view_1 or AST1 (item 144), and materialized view_2 or AST2 (item 146). For purposes of illustration, AST1 refers to both BASE1 and BASE2, and AST2 only refers to BASE2. Within the DBMS 116 there is contained a module or unit of executable computer programmed instructions or code (operations S160 to S176 inclusive) for directing CPU 104 to manage the base table 140 and base table 142, and materialized view 144 and materialized view 146. It will be appreciated that the instructions may be implemented in any computer programming language and translated into processor-readable instructions or code for execution by the processor of the data processing system 102. In an alternative embodiment, it may be appreciated that operations S160 to S176 may reside in another programmed module which operates independently of the DBMS 116. The operation of the DBMS 116 may include managing multiple materialized views associated with a base table as well as multiple base tables referenced by or associated with a materialized view. For the purpose of simplicity, the example assumes that all base tables are stored in one partition, and hence there is only one starting RID per load appended base table.

The following describes a method for directing a data processing system to incrementally process a base table and a materialized view both stored in the data processing system, in which the materialized view is associated with the base table. In the preferred embodiment, the materialized view is associated with many base tables, and the materialized views contain identifiers related to many base tables. It will be appreciated that the data processing system may be a distributed data processing system, and the base table may include partitions distributed throughout the distributed data processing system. DBMS 116 of FIG. 1 executes operation S160 which includes load inserting data into BASE1 and load inserting data into BASE2. It is assumed that the starting RIDs stored in page 0 for BASE1 and BASE2 are N1. The starting RID may be an identifier that simply identifies data newly load appended to the base table. In the preferred embodiment, the identifier is a row identifier (RID) that identifies a row of data that has been newly load appended into the base table. Both BASE1 and BASE2 are placed into a check pending read access state. Read access is still available on the initial non-appended data of both BASE1 and BASE2. The state of AST1 and AST2 are not affected. Both AST1 and AST2 are still available for query optimization. The following indicates the states of the base tables and the materialized views after operation S160 is executed:

| TABLE | STATE | RDC | PAGE0RID | SUM RID |
|-------|-------|-----|----------|---------|
| BASE1 | CPRA  | 0   | N1       | N/A     |
| BASE2 | CPRA  | 0   | N1       | N/A     |
| AST1  | FA    | 0   | 0        | N/A     |
| AST2  | FA    | 0   | 0        | N/A     |

DBMS 116 executes operation S162 which includes load inserting data into BASE1 and load inserting data into BASE2. Another set of rows are load appended into BASE1 and BASE2. The starting RIDs still remain as N1 since non-zero starting RIDs are not overwritten. It will be shown that the DBMS 116 places an existing identifier into a location that does not contain any other identifiers identifying any other data newly load appended to the base table, and blocks the placement of the existing identifier into the location containing another identifier identifying other data newly load appended to the base table. In the preferred embodiment, the location is the materialized view for simplicity.

The following indicates the states of the base tables and the materialized views after operation S162 is executed:

| TABLE | STATE | RDC | PAGE0 RID | SUM RID |
|-------|-------|-----|-----------|---------|
| BASE1 | CPRA  | 0   | N1        | N/A     |
| BASE2 | CPRA  | 0   | N1        | N/A     |
| AST1  | FA    | 0   | 0         | N/A     |
| AST2  | FA    | 0   | 0         | N/A     |

DBMS 116 executes operation S164 which includes setting the integrity for BASE2 to immediate checked in which case BASE2 is incrementally checked for integrity violations. This operation includes setting integrity of the base table having an identifier that identifies data newly load appended to the base table. Setting integrity of the base table changes the existing identifier to a value indicating the base table has been constraint checked. For simplicity, the value may be a zero value. BASE2 is placed in a no data movement state while both AST1 and AST2 are placed in a check pending no access state. The rid_dep_count (that is, the RDC) of BASE2 is set to '2' (that is, the RDC indicates that there are two materialized views, AST1 and AST2, associated with BASE2 that need to be incrementally refreshed). Also, the starting RID of BASE2 is copied to a materialized view packed descriptor of BASE1 and BASE2. The following indicates the states of the base tables and the materialized views after operation S164 is executed:

| TABLE | STATE | RDC | PAGE0 RID | SUM RID    |
|-------|-------|-----|-----------|------------|
| BASE1 | CPRA  | 0   | N1        | N/A        |
| BASE2 | NDM   | 2   | 0         | N/A        |
| AST1  | CPNA  | 0   | 0         | BASE2 = N1 |
| AST2  | CPNA  | 0   | 0         | BASE2 = N1 |

DBMS 116 executes operation S166 which includes incrementally refreshing AST2 by using an identifier contained in the materialized view, in which the contained identifier identifies the location of newly appended data for incrementally refreshing the materialized view. Since the starting RID of BASE2 is N1, load appended rows in the previous two load appended rows of data into BASE2 are used in the incremental refresh. Once AST2 is incrementally refreshed, AST2 is available immediately for query optimization. The RDC of BASE2 is decreased to '1' and BASE2 remains in the no data movement state because AST1 still requires to be incrementally refreshed. The contained identifier may be removed from an incrementally refreshed materialized view.

The following indicates the states of the base tables and the materialized views after operation S166 is executed:

| TABLE | STATE | RDC | PAGE0 RID | SUM RID    |
|-------|-------|-----|-----------|------------|
| BASE1 | CPRA  | 0   | N1        | N/A        |
| BASE2 | NDM   | 1   | 0         | N/A        |
| AST1  | CPNA  | 0   | 0         | BASE2 = N1 |
| AST2  | FA    | 0   | 0         | N/A        |

DBMS 116 executes operation S168 which includes load inserting or appending another set of data into BASE2 (that is, a third set of rows are now load appended into BASE2). An example of a set of data may be a row of data to be load appended into a base table. BASE2 is placed back into the check pending read access state even before AST1 has been refreshed. The starting RID in page '0' of BASE2 is now N3. The following indicates the states of the base tables and the materialized views after operation S168 is executed:

| TABLE | STATE | RDC | PAGE0 RID | SUM RID    |
|-------|-------|-----|-----------|------------|
| BASE1 | CPRA  | 0   | N1        | N/A        |
| BASE2 | CPRA  | 1   | N3        | N/A        |
| AST1  | CPNA  | 0   | 0         | BASE2 = N1 |
| AST2  | FA    | 0   | 0         | N/A        |

DBMS 116 executes operation S170 which includes setting integrity for BASE2 to immediate checked in which case BASE2 is incrementally checked for integrity violations. BASE2 is placed into a no data movement state while AST2 is placed back into a check pending no access state. The rid_dep_count of BASE2 is set back to '2'. The starting RID of BASE2 is now only copied to the AST2 and not to AST1 as there is already a non-zero starting RID for BASE2 in the materialized view packed descriptor of AST1. The following indicates the states of the base tables and the materialized views after operation S170 is executed:

| TABLE | STATE | RDC | PAGE0 RID | SUM RID |
|-------|-------|-----|-----------|---------|
| BASE1 | CPRA  | 0   | N1        | N/A     |
| BASE2 | NDM   | 2   | 0         | N/A     |
| AST1  | CPNA  | 0   | 0         | BASE2 = N1 |
| AST2  | CPNA  | 0   | 0         | BASE2 = N3 |

DBMS 116 executes operation S172 which includes setting integrity for BASE1 to immediate checked in which case BASE1 is incrementally checked for integrity violations. BASE1 is placed into a no data movement state. The rid_dep_count of BASE1 is set to '1'. The starting RID of BASE1 is now only copied to a materialized view packed descriptor of AST1. The following indicates the states of the base tables and the materialized views after operation S172 is executed:

| TABLE | STATE | RDC | PAGE0 RID | SUM RID |
|-------|-------|-----|-----------|---------|
| BASE1 | NDM   | 1   | 0         | N/A     |
| BASE2 | NDM   | 2   | 0         | N/A     |
| AST1  | CPNA  | 0   | 0         | BASE2 = N1, BASE1 = N1 |
| AST2  | CPNA  | 0   | 0         | BASE2 = N3 |

DBMS 116 executes operation S174 which includes incrementally refreshing AST2. Since the starting RID of BASE2 is N3, only the load appended rows of operation 168 described above are used in the incremental refresh operation. AST2 is available immediately for query optimization. The rid_dep_count of BASE2 is decreased to '1' and BASE2 remains in no data movement state because AST1 still requires to be incrementally refreshed. The following indicates the states of the base tables and the materialized views after operation S174 is executed:

| TABLE | STATE | RDC | PAGE0 RID | SUM RID |
|-------|-------|-----|-----------|---------|
| BASE1 | NDM   | 1   | 0         | N/A     |
| BASE2 | NDM   | 1   | 0         | N/A     |
| AST1  | CPNA  | 0   | 0         | BASE2 = N1, BASE1 = N1 |
| AST2  | FA    | 0   | 0         | N/A     |

DBMS 116 executes operation S176 which includes incrementally refreshing AST1 and incrementally refreshing AST2. Since the starting RIDs of both BASE1 and BASE2 are N1, the load appended rows from operations 160 and 162 for BASE1, and the load appended rows from operations 160, 162, and 168 for BASE2 are used in the incremental refresh operation. AST2 is available immediately for query optimization. The rid_dep_counts of both BASE1 and BASE2 are decreased to '0' and hence both BASE1 and BASE2 may be placed in a full access state. The following indicates the states of the base tables and the materialized views after operation S176 is executed:

| TABLE | STATE | RDC | PAGE0 RID | SUM RID |
|-------|-------|-----|-----------|---------|
| BASE1 | FA    | 0   | 0         | N/A     |
| BASE2 | FA    | 0   | 0         | N/A     |
| AST1  | FA    | 0   | 0         | N/A     |
| AST2  | FA    | 0   | 0         | N/A     |

As described in the above example, one embodiment of the present invention advantageously provides incremental refresh of materialized views, and also provides higher availability and flexibility in the order of processing.

FIG. 2 shows a high level overview of operation S200 of DBMS 116 of FIG. 1 in which the DBMS 116 is directed to managing base tables and materialized views related to the base tables. It will be appreciated that the operation for loading data into the base table (that is operation S206), the operation for checking constraints (that is operation S210), and the operation for refreshing materialized views (that is operation S214) may be performed independently of each other and may be performed in any desired order. Once any of operations S206, S210 or S214 are completed, operations S204, S208 or S212 allow a user with the choice of re-executing any of operations S206, S210 or S214 or terminate operations S200 altogether. Hence, the preferred embodiment of the present invention provides independent order of programmed operation.

Operation S202 begins execution of operation S200. In a preferred embodiment, operation S200 is contained in a module of computer executable code within DBMS 116.

Operation S204 checks whether a user desires to load append into a base table. If the user indicates (such as via keyboard or mouse for example) a desire to load append a base table T, control is transferred to operation S206 and the base table T may be load appended with data. If the user indicates an alternative desire to not load append the base table T, control is transferred to operation S208 and the operation for load appending the base table T may be bypassed at this time.

Assuming that there are "n" base tables that are numbered from 1, 2, . . . "i", . . . , "n", operation S206 includes accepting a user selection for a specific numbered or identified base table from a list of identified base tables. For example, the user may select or identify the i-th base table T(i), or simply base table T(i), into which data is to be loaded. Operation S206 also includes initiating a load append of data into the identified base table T(i) by having control transferred to operation S300A of FIG. 3A (in which operation for loading the base table T(i) may be executed), and then by having control transferred from Operation S300A to operation S300B of FIG. 3B (in which operation for loading into each partition of the base table T(i) may be executed). Once operation S300B ends at operation S324, control is then transferred to operation S204 of FIG. 2.

Once control is transferred from operation S204 (that is, a user desires to not load append a base table T), operation S208 checks whether the user desires to check the base table T for constraint violations. If the user indicates (such as via keyboard or mouse for example) a desire to check the base table T for constraint violations, control is transferred to operation S210 in which case the constraint violations may be checked for the base table T. If the user indicates an alternative desire to not check the base table T for constraint violations, control is transferred to operation S212 and the operation for checking the base table T for constraint violations may be bypassed at this time.

Assuming that there are "n" base tables that are numbered from 1, 2, . . . "i", . . . , "n", operation S210 includes accepting a user selection for a specific numbered or identified base table from a list of identified base tables. For example, the user may select or identify the i-th base table T(i), or simply base table T(i), for which to check for constraint violations. The checking of constraint violations may be executed to completion on the base table T(i) by having control transferred to operation S400 of FIG. 4 in which case operations for constraint checking of the base table T(i) may begin. Once operation S400 is completed, control is transferred back to operation S204.

Once control is transferred from operation S208 (that is, a user desires to not check a base table T for constraint violations), operation S212 checks whether the user desires to check whether to refresh a materialized view. If the user indicates (such as via keyboard or mouse for example) a desire to refresh a materialized view related to a base table T, control is then transferred to operation S214 in which case the materialized view (related to the base table T) may be refreshed. If the user indicates an alternative desire to not refresh the materialized view, control is then transferred to operation S216 and the operation for refreshing the materialized view may be bypassed at this time.

Assuming that there are "m" materialized views that are numbered from 1, 2, . . . "j", . . . , "m", operation S214 includes accepting a user selection for a specific numbered or identified materialized view from a list of identified materialized views. For example, the user may select or identify the j-th materialized view AST(j), or simply AST(j), for which to refresh.

Figure 8:
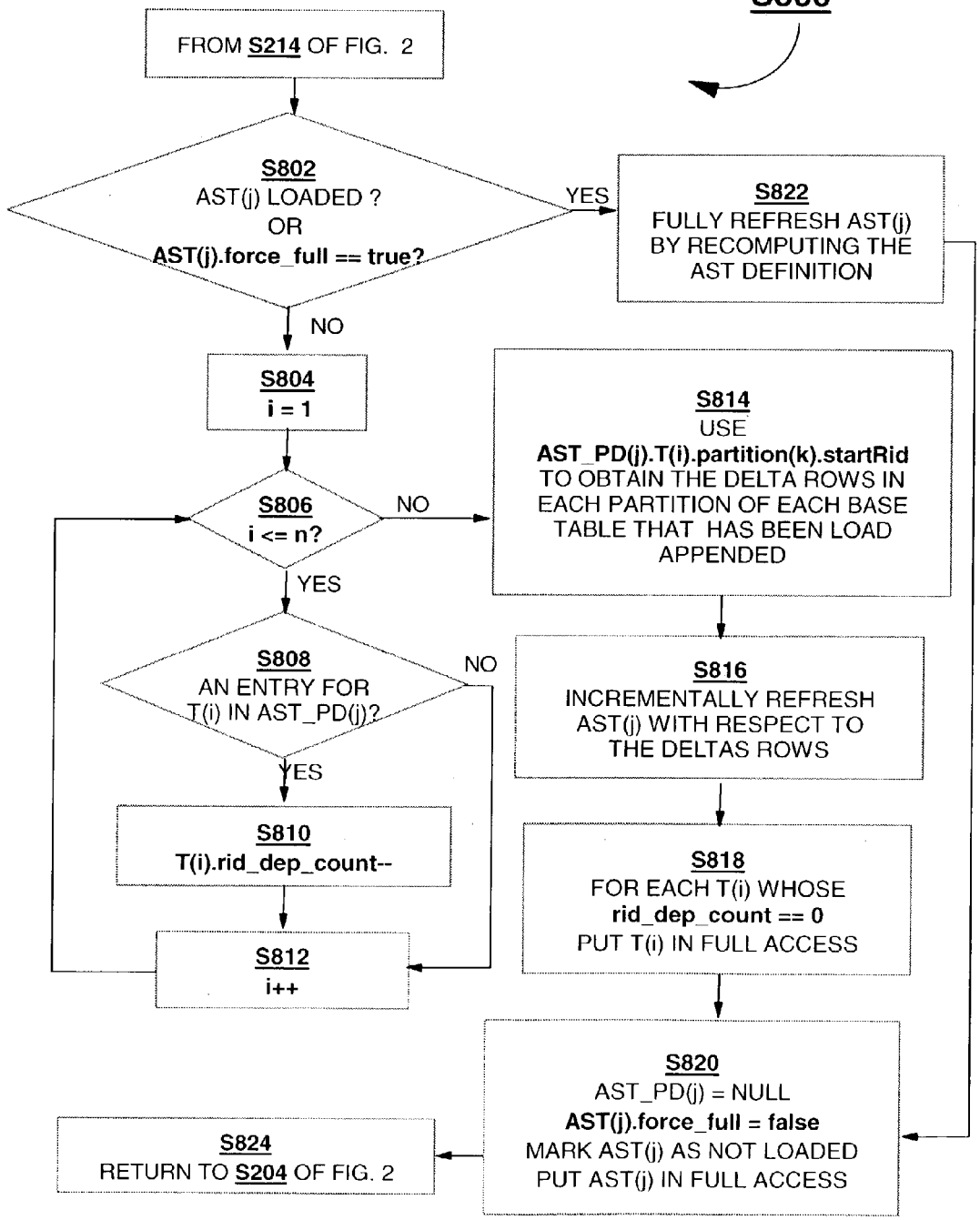
FIG. 8 shows operation of the DBMS of FIG. 1 for refreshing the materialized view.

The refreshing of AST(j) may be executed to completion by having control transferred to operation S800 of FIG. 8 in which case operations for refreshing AST(j) may be completed. Once operation S800 is completed, control is transferred back to operation S204.

Figure 3A:
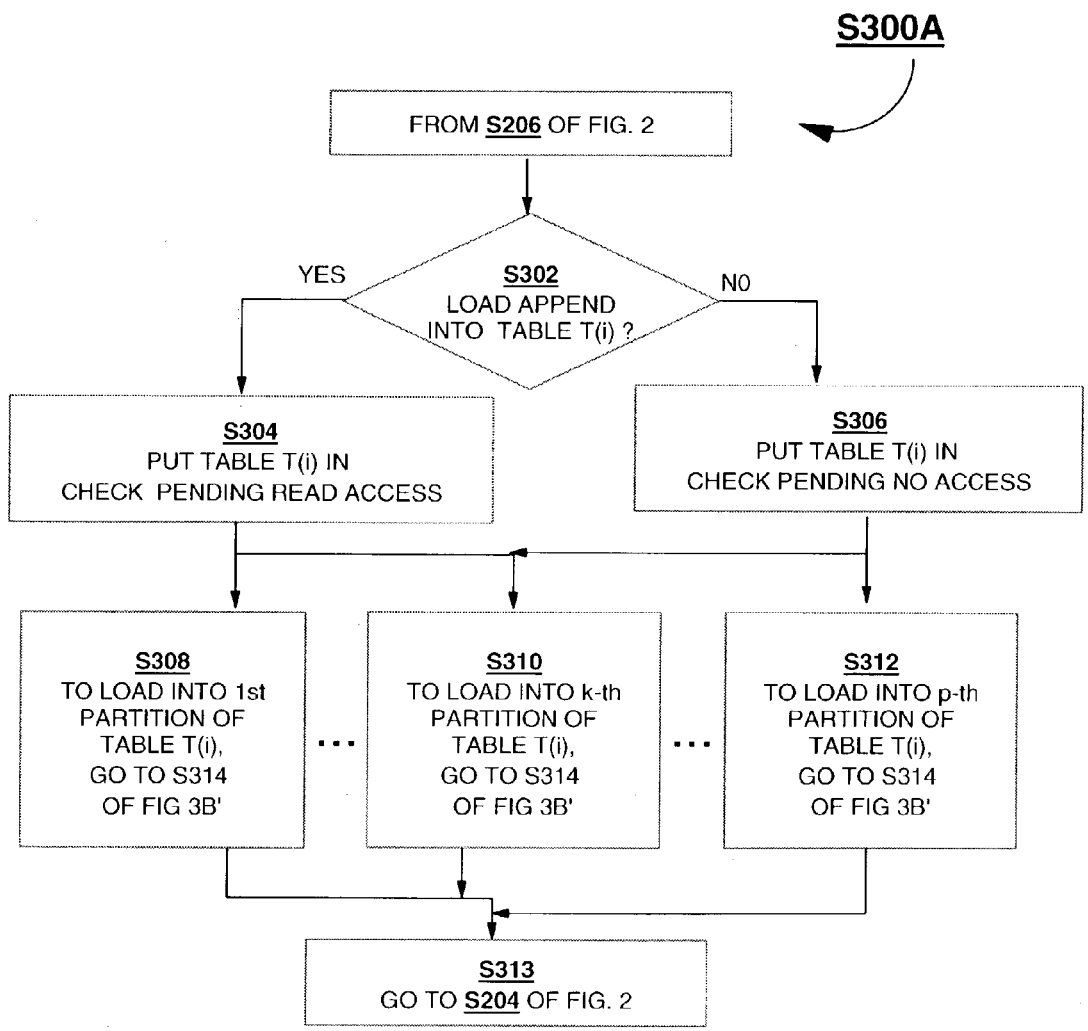
FIG. 3A shows operation of the DBMS of FIG. 1 for loading data into a base table.

FIG. 3A shows operation S300A of the DBMS 116 of FIG. 1 in which the DBMS 116 is directed to load data into base table T(i). It is assumed that the data in the base table T(i) is spread across 'P' partitions. Loading data into the base table T(i) is translated into loading to individual partitions that base table T(i) is defined thereon. The loaded base table is placed into either check pending read access state or placed into check pending no access state depending on the mode of the load operation.

Control was transferred from operation S206 of FIG. 2 (in which initial conditions were set up for performing a load append to a base table T) to operation S302. Operation S302 determines whether a load append operation was performed on a base table T(i). If it is determined that the load append operation was not performed on the base table T(i), the operation that was performed was a load replace operation (that is, not a load append operation) and in this case control may be transferred to operation S306. If it is determined that the load append operation was performed on the base table T(i), control may be transferred to operation S304.

Operation S304 includes placing a base table T(i) in a check pending read access state. Operation S306 includes placing a base table T(i) in a check pending no access state. It will be appreciated that operation S306 is executed when a load append into the base table is not executed or performed, and instead a load replace operation into the base table was executed or performed. For a load append operation, only the appended rows require checking for constraint violations and hence the base table is placed in a check pending read access state, and a user is allowed the ability to read non-appended rows. However, for a load replace operation, the entire base table now contains new data, and so the entire base table requires checking for constraint violations, in which case the user may not have access to the entire table and hence the need to place the base table in a check pending no access state.

It will be appreciated that in a partitioned database environment, a base table T may be spread across multiple partitions (in which the partitions may reside in several independently operating data processing systems). So when loading data into the base table, loading into each partition of the base table may also be required. Assuming that the base table is spread across 'p' partitions, operation S308 includes loading data into the first partition of the base table, operation S310 includes loading into some arbitrary k-th partition of the base table, and operation S312 includes loading into the p-th partition of the base table. It will be appreciated that each of these partitions may be stored in the memory of different data processing systems which are operationally coupled via a network to form a distributed data processing environment, and thus it will be appreciated that operations S308, S310, and S312 may be executed or conducted in a parallel (independent) fashion. In an alternative embodiment, operations S308, S310, and S312 may be conducted in a serial manner if this arrangement may be found to be convenient (for example, for the case when the base table and related partitions all reside in a single data processing system).

It will be appreciated that FIG. 3A does not suggest or unnecessarily restrict that only the 1st, the k-th and the p-th partitions of base table T(i) are going to be loaded with data. It is to be understood that potentially either all partitions or some partitions of base table T(i) may be loaded with data. Which specific partitions that may be loaded will depend on the content of the data to be loaded to base table T(i). Some data may be loaded to some partitions, while other data may be loaded to other partitions.

Any of operations S308, S310, or S312 will transfer control to operation S314 of FIG. 3B, which then begins operation for loading into a particular partition of the base table such as, for example, the k-th partition of base table T(i) (the k-th partition of the base table T(i) is stored in a data processing system while the remaining partitions may be stored in other data processing systems).

FIG. 3B shows operations 300B for loading data in any particular single partition stored in the memory of a data processing system. It will be appreciated that operation 300B may be performed after control is transferred from operation S308, or may be performed after control is transferred from operation S310, or may be performed after control is transferred from operation S312. For sake if convenience for describing the preferred embodiment of the invention, FIG. 3B shows operation S300B for loading into the k-th partition of base table T(i).

In the preferred embodiment of the present invention, different partitions of base table T(i) may reside on physically different data processing systems which are interconnected via a network. Operation S300B may be executed by a data processing system which may need to process partitions which may be stored in that data processing system. In an alternative embodiment of the present invention, all of the partitions reside in a single data processing system, in which case operation S300B is executed by the single data processing system.

The following describes the RID management operation when loading into a particular partition of base table T(i). At the end of this operation, T(i).partition(k).loadOpr will be set to the most expensive load operation that occurred on that partition of the base table since the last time constraints were checked on the base table, in which a load_replace operation is more expensive than a load_append operation, which in turn is more expensive than a load_none operation. If the most expensive load operation is the load_append operation, T(i).partition(k).startRid is set to the RID of the first row of load appended data so that incremental constraints checking can begin from that row onward. This RID will eventually be used to determined where to start the incremental constraint processing for the base table, and also where to start to get the delta rows for this base table to incremental refresh its ASTs.

Operation S314 determines whether a load append operation was performed on base table T(i). If a load append operation was not performed on base table T(i), control is transferred to operation S322. If a load append operation was performed on base table (i), control is transferred to operation S316.

Operation S316 determines whether T(i).partition(k).loadOpr was loaded with the value of load_none. If T(i).partition(k).loadOpr was loaded with the value of load_none, control is transferred to operation S318. If T(i).partition(k).loadOpr was not loaded with the value of load_none, control is transferred to operation S324.

Since T(i).partition(k).loadOpr was loaded with the value of load_none, operation S318 will set T(i).partition(k).loadOpr to the value of load_append. This loadOpr field is used to determine whether this partition has been loaded. And if the partition has been loaded, this field is also used to identify the type of load (that is, replace or insert). Later in operation S402 and operation S406, the field is used to determine whether there is a need to perform or execute full constraint checking (for a load_replace operation), incremental constraint checking (for a load_insert operation), or no constraint checking (for a load_none operation). In operation S318, it is determined that at present a load append operation is being performed on this partition, and this partition has not been previously loaded, in which case there is a need to set loadOpr=load_append to update the current load state of this partition.

Operation S320 includes setting T(i).partition(k).startRid to the value of the RID of the first row of load appended data. Any rows with a RID greater or equal to this startRID will be part of the load appended portion. So the startRID is set here to mark the starting point of the load appended rows. This startRID is later used in operation S606 to locate all load appended rows that require constraint checking. This startRID is also copied to the packed descriptor of the ASTs in operation S602 so that incremental refresh of the ASTs can locate the load appended rows.

Operation S322 includes setting T(i).partition(k).loadOpr to the value of load_replace. The usage of the loadOpr is described above. The load_Opr=load must be set here to indicate that a load replace operation has occurred on this partition. This condition will be tested later in operation S406 to force the base table to be subjected to a full constraint checking operation and to force the ASTs to be subjected to a full refresh operation.

Operation S324 includes transferring control to operation S204 of FIG. 2.

FIG. 4 shows operation S400 for constraint checking for base table T(i). The following will describe the overview of constraints checking on base table T(i). If base table T(i) has been loaded, its ASTs (that is, materialized views) are put into check pending no access as they are now out of sync with base table T(i). If base table T(i) has been load replaced (that is, a load replace operation was performed on the base table T(i)), full constraints checking on the table is performed. However, if base table T(i) has been load inserted (that is, a load insert operation was performed on the base table T(i)), an incremental constraint checking on the table is performed. If base table T(i) has not been loaded, no constraint checking is done. Once constraints are checked on the base table T(i), a corresponding rid_dep_count is examined to see if there are some ASTs that need to be incrementally refreshed with respect to its load appended rows and put base table T(i) into Normal No Data Movement (state) or Normal Full Access (state) appropriately. In any case, T(i).partition(k).loadOpr and T(i).partition(k).startRid are reset to prepare for the next load (that is, load operation) into base table T(i).

Control is transferred from operation S210 of FIG. 2 to operation S402, in which it is determined whether base table T(i) was loaded (that is, was a load operation performed on base table T(i)). If base table T(i) was not loaded, control is transferred directly to operation S416; thus skipping the need for constraint checking on the table. If base table T(i) was loaded, control is transferred to operation S404.

Operation S404 includes putting all dependent ASTs of T(i) into a check pending no access state. Operation S404 is required once the base table T(i) is placed out of its check pending state (operation S418 and operation S420). The user may now have access to the load appended rows of the base table. Thus, the ASTs of base table T(i) are no longer in sync with base table T(i). All dependent ASTs are placed in a check pending no access state to prevent the user from the accessing the content of the ASTs that are no longer correct with respect to their query definition.

Operation S406 determines whether base table T(i) was load replaced (that is, this operation determines whether a load replace operation was performed on the base table T(i)). If base table T(i) was load replaced, control is transferred to operation S412. If base table T(i) was not load replaced, the base table must have been load appended so control is transferred to operation S408.

For the case when a base table has been load appended, operation S408 includes initiating incrementally constraint checking of the base table T(i). Thus, incrementally constraint checking of base table T(i) is performed because only the load appended rows require constraints checking. It will be appreciated that incremental constraint processing operation may be faster than a full constraint processing operation (that is, operation S412) where the entire base table is checked for constraints. Once base table T(i) has been incrementally constraint checked, operation S408 includes passing control to operation S602 of FIG. 6 in which case operations S600 may begin for incremental constraint processing. Once operation S600 has completed execution, control may then be transferred to operation S416.

For the case when a base table has been load replaced (that is a load replace operation was performed on the base table), operation S412 is executed which includes initiating operation for full constraint checking for base table T(i). Since the entire contents of the base table has been replaced, all rows in the base table will required constraint checking. Operation S412 includes passing control to operation S502 of FIG. 5 in which operation S500 may begin full constraint processing. Once operation S500 has completed execution, control may be transferred to operation S416.

Operation S416 determines whether T(i).rid_dep_count is set to zero (that is, whether there are any materialized views that need to be incrementally refreshed with respect to the load appended data of base table T(i)). If T(i).rid_dep_count is set to zero, control is transferred to operation S418.

However, if T(i).rid_dep_count is not set to zero, control is transferred to operation S420.

Since T(i).rid_dep_count is set to zero, operation S418 will place base table T(i) in a full access state. T(i).rid_dep_count is zero when there are no more ASTs that still need to be incrementally refresh with respect to the load appended data of T(i). Base table T(i) is placed in a normal full access state to allow full access on the base table.

Since T(i).rid_dep_count is not set to zero, operation S420 includes putting base table T(i) in NDM (that is, no data movement). T(i).rid_dep_count is not zero when there are still some ASTs that still need to be incrementally refresh with respect to the load appended data of T(i). Base table T(i) is placed into a no data movement state to prevent operations on base table T(i) that may change the RIDs on base table T(i) which—in consequence—may invalidate the startRIDs that were copied to the packed descriptor of the ASTs (operation S602) that are to be used latter when operation for incrementally refreshing the ASTs is performed.

Operation S422 includes, for each partition (k) of base table T(i), setting T(i).partition(k).loadOpr to the value of load_none, and setting T(i).partition(k).startRid to the value of zero. Since the operation for checking constraints for this base table is completed, there is a need to reset (that is, loadOpr=load_none and the startRID=0) in which case the reset prepares conditions for the next load operation of the base table.

Operation S424 transfers control to operation S204 of FIG. 2.

FIG. 5 shows operation S500 for full constraint checking of a base table T(i). Once the base table T(i) is fully checked for constraints, all of its (corresponding) materialized views must be fully refreshed as they can no longer be incrementally refreshed. Also the AST_PD of the materialized views (ASTs) are set to NULL since no startRIDs are required for full refresh. The rid_dep_count of base table T(i) is reset to '0' since no ASTs depend on its load appended portion of data.

Operation S502 includes, for each dependant AST(j) of base table T(i), setting AST(j).force_full to the value of "true". This is required as once the base table is fully checked for constraints, its ASTs can no longer be incrementally refreshed.

Operation S504 includes setting T(i).rid_dep_count to the value of zero. The rid_dep_count is set to zero as all ASTs can no longer be incrementally refresh, which is indicated by setting force_full=true in operation S502. The benefit of having rid_dep_count==0 is that the base table T(i) can later be brought into a normal full access state (operation S416 and operation S418).

Operation S506 includes checking the entire base table T(i) for constraint violations. This operation checks the entire base table for constraint violations. All the rows in the base table need to be scanned and each row needs to be verified that they satisfy every constraint defined on the base table.

Operation S508 transfers control to operation S416 of FIG. 4. Once the checking of the base table for constraint violations is completed, the user is permitted access to the loaded rows. Control is transferred to operation S416 which determines whether the base table is placed in a normal full access state or is placed in normal NDM state.

FIG. 6 shows operation S600 for incremental constraint checking for base table T(i). Initially, starting RIDs information of base table T(i) are copied to all its corresponding ASTs so that the corresponding ASTs can be incrementally refreshed with respect to the load appended data in base table T(i). Then, incremental constraints checking is carried out.

Operation S602 includes, for each dependent AST(j) of base table T(i), copying RIDs of base table T(i) to AST_PD of AST(j). This is done so that incremental refresh of AST(j) can locate all the load appended rows to the base table T(i) since the last time that AST(j) has been refreshed. To complete operation S602, control is transferred to operation S702 of FIG. 7.

Operation S606 includes using the startRid in each partition of base table T(i) to build the ridge predicate used to locate all the loaded appended rows that require constraints checking. Operation S606 is known to those skilled in the art, and this operation is further described in published Canadian Patent Application Number CA9-1999-0028 (the title of which is "System And Method For Selective Incremental Deferred Constraint processing After Bulk Loading Data").

Operation S608 transfers control to operation S416 of FIG. 4.

Figure 7:
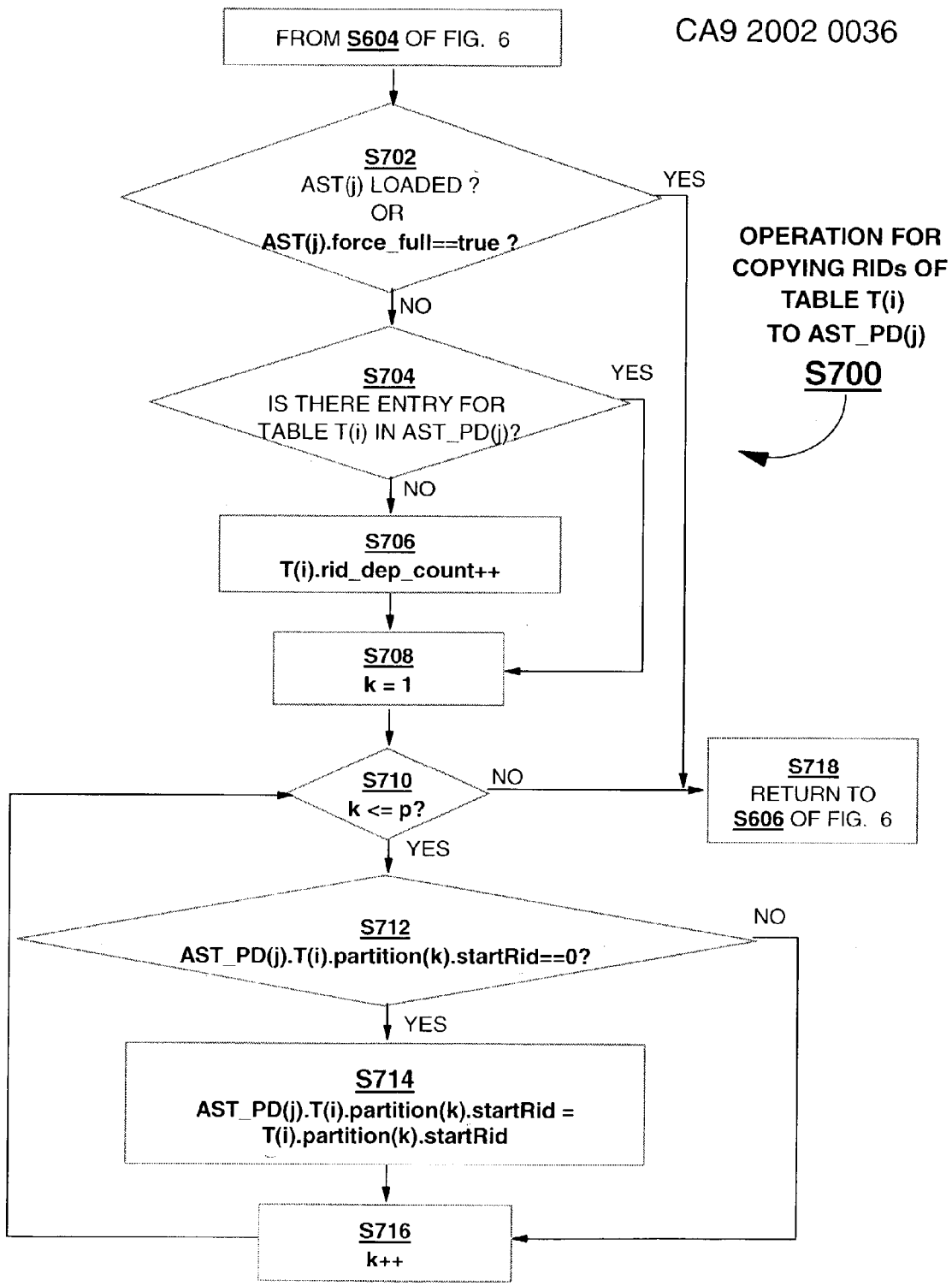
FIG. 7 shows operation of the DBMS of FIG. 1 for copying RIDs of the base table to a packed descriptor of a materialized view.

FIG. 7 shows operation S700 for completing the copying RIDs of base table T(i) to AST_PD(j). The following will describe operation for copying the starting RIDs information from base table T(i) to its ASTs. If an AST is loaded or is forced to be fully refreshed, then it can no longer be incrementally refreshed, so there is no need to copy the RIDs info to such an AST. For all other ASTs, it is initially determined whether the AST already has an entry for base table T(i) in its AST_PD (meaning the AST already depends on a prior load append to base table T(i)). If not, then the rid_dep_count of base table T(i) is incremented since this AST now depends on it. Next, the starting RIDs info of base table T(i) is copied to the AST. Non-zero starting RIDs are not over written so to allow multiple load append and incremental integrity checking operations on the base tables before incrementally refreshing the materialized views.

Operation S702 determines whether AST(j) was loaded (that is, whether a load operation was performed on AST(j)), or determines whether AST(j).force_full is set to "true". If any one of these two conditions is satisfied, control is transferred to operation S718; otherwise, control is transferred to operation S704.

Operation S704 determines whether there is an entry for base table T(i) in AST_PD(j). If there is an entry for base table T(i) in AST_PD(j), control is transferred to operation S708. If there is no entry for base table T(i) in AST_PD(j), control is transferred to operation S706.

Operation S706 includes incrementing T(i).rid_dep_count. Given that there was no entry for base table T(i) in AST_PD(j) (operation S704), this implies that AST(j) is rid_dependent on T(i) and this fact has not yet been recorded, in which case the increment of the rid_dep_count of base table T(i) is needed to record that yet another AST is now rid_dependent on it. Note that if operation S704 evaluated to satisfy the YES condition, it means that AST(j) is rid_dependent on T(i) was recorded, in which case operation S706 is skipped to prevent incorrectly incrementing T(i).rid_dep_count twice for the same AST.

Operation S708 includes setting parameter "k" to a value of 1. As can be seen from FIG. 7, operations S710, S712, S714, and S716 form a programmed loop that goes through all p partitions of the base table T(i) and copies the startRID at this partition, T(i).partition(k).startRid to the AST_PD(j).T(i).partition(k).startRid. The variable k indicates an iterative step of the programmed loop. Operation S708 initializes k=1 to indicate the first iteration of the programmed loop.

Operation S710 determines whether parameter "k" is less than or equal to the value of parameter "p". If the current value of parameter "k" is less than or equal to the value of parameter "p", control is transferred to operation S712. If the current value of parameter "k" is not less than or not equal to the value of parameter "p", control is transferred to operation S718. Basically, this operation tests whether all p iterations of the programmed loop have been executed. If all p iterations of the programmed loop have been executed, operation S710 will evaluate to a NO condition, and then execution exits the programmed loop, in which case control is transferred to operation S718. If not all p iterations have completed execution, operation S710 will evaluate to YES and execution proceeds back into the body of the programmed loop (that is, operation S712).

Operation S712 includes determining whether AST_PD (j).T(i).partition(k).startRid is set to the value of zero. If AST_PD(j).T(i).partition(k).startRid is set to the value of zero, control is transferred to operation S714. If AST_PD (j).T(i).partition(k).startRid is not set to the value of zero, control is transferred to operation S716. As mentioned above, this is so that non-zero starting RIDs are not over written so to allow multiple load append and incremental integrity checking operations on the base tables before incrementally refreshing the materialized views.

Operation S714 includes setting AST_PD(j).T(i).partition (k).startRid to the value of T(i).partition(k).startRid. This copy is done so that by the time an incremental refresh of AST(j) is performed, the AST_PD(j).T(i).partition(k).startRid is used to locate all the load appended rows on partition (k) of base table T(i) since the last time AST(j) was refreshed.

Operation S716 includes incrementing counter "k", and control is transferred to operation S710 for further iterations. This is done to go to the next iteration of the programmed loop so that the RID copying for the next partition may be performed.

Operation S718 transfers control back to operation S606 of FIG. 6.

FIG. 8 shows operation S800 for refreshing AST(j), assuming AST(j) depends on 'n' base tables. The following describes the operation for refreshing an AST. If the AST has been loaded or is forced to be fully refresh, a full refresh of the AST is performed by recomputing the query definition of the AST. If the AST can be incrementally refreshed, processing continues to a programmed loop that decrements by the rid_dep_count of the base tables that appear in the AST_PD because the AST is no longer RID dependent on these base tables once the AST has been refreshed. The starting RIDs information for each loaded appended base table is taken from the AST_PD to be used to obtain the delta rows in the base tables used to incrementally refresh the AST. For those base tables whose rid_dep_count has been decreased to '0', the base tables are placed from a normal no data movement state to a normal full access state as no other ASTs are rid dependent on them. The AST is placed back in a normal full access state and the AST_PD flag, force_full flag, and load flags are reset which prepares for the next refresh operation.

Control was transferred from operation S214 of FIG. 2 to operation S802, in which it is determined whether AST(j) was loaded or it is determined whether AST(j).force_full is currently set to a value of "true". If any one of these two conditions is true, control is transferred to operation S822; otherwise, control is transferred to operation S804.

Operation S804 includes setting the initial value of counter "i" to a value of 1. Operations S806, S808, S810, and S812 form a programmed loop that processes each base table (assuming there are n base tables) of AST(j) to see which base tables this AST is rid_dependent thereon, and eventually the rid_dep_count of these base tables is decremented. Operation S804 initializes parameter i=1 so that the processing may begin for the first base table entry.

Operation S806 determines whether the current value of counter "i" is less than or equal to the current value of "n". If the current value of counter "i" is less than or equal to the current value of "n", control is transferred to operation S808. If the current value of counter "i" is not less than or not equal to the current value of "n", control is transferred to operation S814. If all base tables of AST(j) has been processed, operation S806 will evaluate to a NO condition and control may be transferred out from the programmed loop and then proceed to operation S814. If there are some base tables yet to be processed, operation S806 will evaluate to a YES condition and then control is transferred back into the programmed loop so that the next base table may be processed.

Operation S808 determines whether an entry for a base table T(i) exists in AST_PD(j). If an entry for base table T(i) exists in AST_PD(j), control is transferred to operation S810. If an entry for base table T(i) does not exist in AST_PD(j), control is transferred to operation S812. If there is an entry for base table T(i) in AST_PD(j), AST(j) is rid_dependent on this base table T(i). Once the AST(j) is refreshed, it will no longer be rid dependent on its base tables, so there is a need to decrement T(i).rid_dep_count (operation S810) because one less AST will be rid_dependent on the base table T(i).

Operation S810 includes decrementing T(i).rid_dep_count.

Operation S812 includes incrementing counter "i".

Operation S814 includes using AST_PD(j).T(i).partition (k).startRid to obtain the delta rows in each partition of each base table that has been load appended. AST_PD(j).T(i).partition(k).startRid stores the RID for the row in partition (k) of base table T(i) such that every row after this row are required to incrementally refresh the AST(j) since last time it was required. This operation includes accessing all the startRIDs in the AST_PD(j) to obtain all rows in the base table T(i) and the delta rows which are required to incrementally refresh the AST since last time it was refreshed.

Operation S816 includes incrementally refreshing AST(j) with respect to the delta rows. Once the delta rows are located, they are used to perform an incremental refresh of the AST. This refresh operation is described in "Maintaining Views Incrementally" and "Efficiently Updating Materialized Views". These references have been previously identified in the detailed description.

Operation S818 includes, for each base table T(i) whose rid_dep_count is set to a value of zero, putting base table T(i) in full access state. The rid_dep_count of the base table T(i) refers to the number of ASTs that are still rid_dependent on the base table T(i). As long as there is at least one AST that is rid_dependent on the base table T(i), the base table T(i) is kept in a no data movement state. Given that the operation is currently refreshing AST(j), the AST(j) is no longer rid_dependent on its base tables (hence the decreasing of rid_dep_count of the base tables of AST(j) in the loop represented in operations S806, S808, S810, and S812). For any one of these base tables, AST(j) may be the last remaining AST that is rid_dependent on it. So for any such base table that no longer has any AST that is rid_dependent on it (indicated by rid_dep_count=0), the state of the base table can be changed from a no data movement state to a full access state.

Operation S820 includes setting AST_PD(j) to a value of NULL, setting AST(j).force_full to a value of false, marking AST(j) as not loaded, and putting AST(j) in full access state. Once the AST is refreshed, these fields are reset to prepare for the next refresh on the AST. The AST is brought into a full access state as the AST is now in sync with its base tables again and the AST may be once again be use for query optimization.

Operation S822 includes fully refreshing AST(j) by recomputing the AST definition. Operation S822 is reached because either the AST has been loaded or either the AST was forced to require a full refresh. This operation performs the full refresh of the AST by recomputing the AST definition.

Operation S824 transfers control to operation S204 of FIG. 2.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiment as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method for directing a data processing system to incrementally process a base table and a materialized view, wherein the base table and the materialized view are stored in the data processing system and the materialized view is associated with the base table, the method comprising:
    setting integrity of the base table having an identifier identifying data newly load appended to the base table; and
    placing the identifier into a location if the location does not contain any other identifier identifying any other data newly load appended to the base table.

2. The method of claim 1, wherein the location is the materialized view.

3. The method of claim 1 further comprising the step of incrementally refreshing the materialized view using the identifier, the identifier identifying a location of newly appended data for incrementally refreshing the materialized view.

4. The method of claim 3 further comprising the step of removing the identifier from the location after the materialized view has been incrementally refreshed.

5. The method of claim 1, wherein the setting step includes changing the identifier to a value indicating the base table has been constraint checked.

6. The method of claim 5, wherein the value is a zero value.

7. The method of claim 2, wherein the materialized view is associated with a plurality of base tables, and the materialized view includes a plurality of identifiers related to the plurality of base tables.

8. The method of claim 1, wherein the identifier is a row identifier identifying a row in the base table.

9. The method of claim 1, wherein the data processing system is a distributed data processing system, and the base table includes partitions distributed throughout the distributed data processing system.

10. A system for directing a data processing system to incrementally process a base table and a materialized view, wherein the base table and the materialized view are stored in the data processing system and the materialized view is associated with the base table, the system comprising:
    means for setting integrity of the base table having an identifier identifying data newly load appended to the base table; and
    means for placing the identifier into a location if the location does not contain any other identifier identifying any other data newly load appended to the base table.

11. The system of claim 10 wherein the location is the materialized view.

12. The data processing system of claim 10 further comprising means for incrementally refreshing the materialized view using the identifier, the identifier identifying a location of newly appended data for incrementally refreshing the materialized view.

13. The system of claim 12 further comprising means for removing the identifier from the location after the materialized view has been incrementally refreshed.

14. The system of claim 10 wherein means for setting the integrity of the base table further includes means for changing the identifier to a value indicating that the base table has been constraint checked.

15. The system of claim 11, wherein the materialized view is associated with a plurality of base tables, and the materialized view includes a plurality of identifiers related to the plurality of base tables.

16. The system of claim 10 wherein the identifier is a row identifier identifying a row in the base table.

17. The system of claim 10 wherein the data processing system is a distributed data processing system, and the base table includes partitions distributed throughout the distributed data processing system.

18. A computer readable medium containing program instructions for directing a data processing system to incrementally process a base table and a materialized view both stored in the data processing system, the materialized view associated with the base table, comprising the instructions for:
    setting integrity of the base table having an identifier identifying data newly load appended to the base table; and
    placing the identifier into a location if the location does not contain any other identifier identifying any other data newly load appended to the base table.

19. The computer readable medium of claim 18, wherein the location is the materialized view.

20. The computer readable medium of claim 18 further comprising the step of incrementally refreshing the materialized view using the identifier, the identifier identifying a location of newly appended data for incrementally refreshing the materialized view.

21. The computer readable medium of claim 20 further comprising the step of removing the identifier from the location after the materialized view has been incrementally refreshed.

22. The computer readable medium of claim 18, wherein the setting step includes changing the identifier to a value indicating the base table has been constraint checked.

23. The computer readable medium of claim 22, wherein the value is a zero value.

24. The computer readable medium of claim 19, wherein the materialized view is associated with a plurality of base tables, and the materialized view includes a plurality of identifiers related to the plurality of base tables.

25. The computer readable medium of claim 18, wherein the identifier is a row identifier identifying a row in the base table.

26. The computer readable medium of claim 18, wherein the data processing system is a distributed data processing system, and the base table includes partitions distributed throughout the distributed data processing system.

* * * * *